March 17, 1936.  C. A. DECARY ET AL  2,034,027
FECUNDITY CALCULATING DEVICE
Filed Dec. 18, 1934  2 Sheets-Sheet 1

Inventors
Anatole Bohémier
Charles A. Decary
By
Attorney.

March 17, 1936. C. A. DECARY ET AL 2,034,027
FECUNDITY CALCULATING DEVICE
Filed Dec. 18, 1934  2 Sheets-Sheet 2
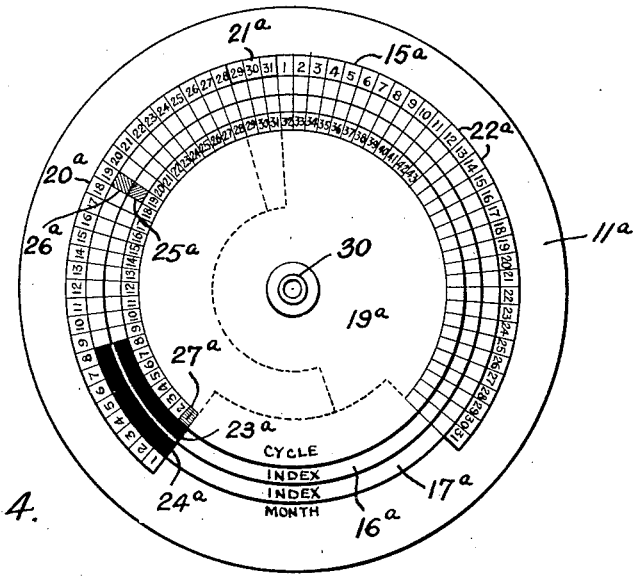
Fig.4.
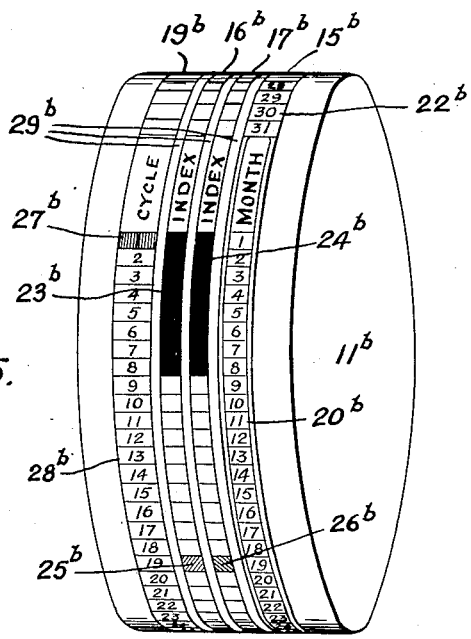
Fig.5.
Inventors
Anatole Bohémier
By Charles A. Decary
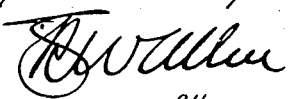
Attorney.

Patented Mar. 17, 1936

2,034,027

UNITED STATES PATENT OFFICE 2,034,027

FECUNDITY CALCULATING DEVICE

Charles A. Decary and Anatole Bohémier, Montreal, Quebec, Canada

Application December 18, 1934, Serial No. 758,107

15 Claims. (Cl. 40—109)

This invention relates broadly to calculating apparatus and more particularly to apparatus for calculating periods of fecundity, and the object of the invention is to provide means whereby periods of fecundity may be easily, quickly and accurately calculated and indicated.

The invention comprises essentially a date scale adjustable to indicate the days of any group of at least two consecutive months, a menstrual cycle scale adjustable to the date scale and an index adjustable to the cycle scale to indicate on the date scale the period of fecundity.

In greater detail, the invention comprises the features and combinations of features herein described and/or illustrated in the accompanying drawings together with all substitutions of equivalents therefor and all such modifications as lie within the scope of the appended claims.

In the accompanying drawings which illustrate various embodiments of the invention, but to the details of which the invention is not limited:—

Fig. 4 is a plan view illustrating the invention embodied in a circular device.

Fig. 5 is a perspective view illustrating the invention embodied in a cylindrical device.

Figure 1:
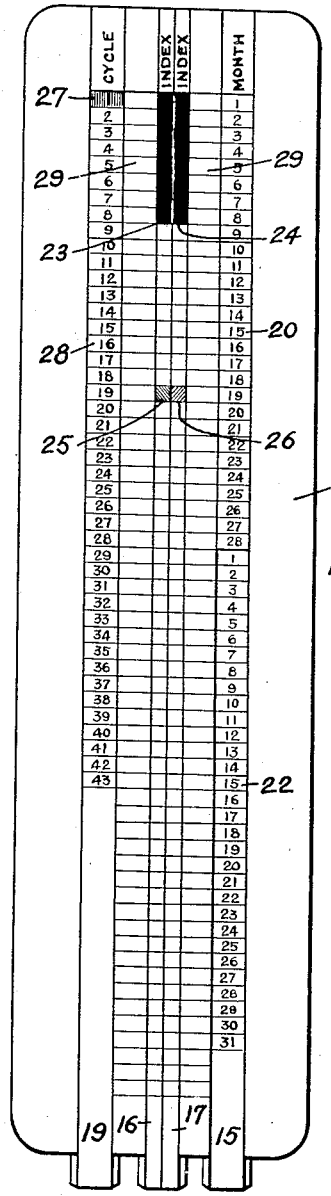
Fig. 1 is a plan view illustrating the invention embodied in apparatus of the slide rule type and shows the apparatus in closed or inoperative form.
Figure 3:
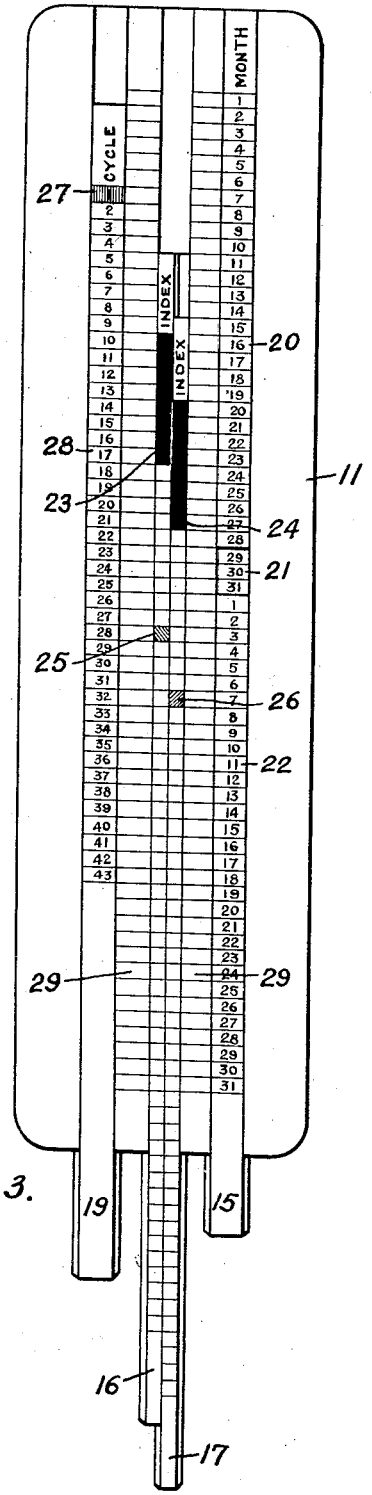
Fig. 3 is a plan view of the device of Fig. 1 and illustrates the operation thereof.
Figure 2:
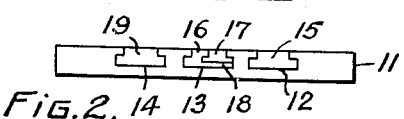
Fig. 2 is an end elevation of the device shown in Fig. 1.

Referring more particularly to the drawings, and especially to Figures 1, 2, and 3 thereof, 11 designates a body portion of generally rectangular oblong form and suitable thickness, which may be a strip of wood, cardboard, metal or composition. The body is provided with three undercut grooves 12, 13, and 14, one of which, namely the groove 12, extends from one end to a point approximately midway between the ends while the other two grooves extend from end to end of the body.

A slide 15 is mounted in the groove 12 and may extend slightly beyond the end of the body, the edges of the slide being formed to cooperate with the undercut edges of the groove to retain the slide in the groove. A pair of relatively movable slides 16 and 17 are mounted in the groove 13 and extend from end to end thereof, and may also extend slightly beyond the end of the body. The face of each slide 16 and 17 is approximately half the width of the groove. The slide 16 is rabbeted for approximately half its width, so as to provide a lateral flange 18 on which the other slide 17 rests, the side wall of the rabbet being undercut to receive and retain the slide 17. The slides 16 and 17 engage the undercut edges of the grooves for retention in the grooves. A single slide is mounted in the groove 14 and extends from end to end of the body and may extend beyond, the edges of this slide engaging the undercut edges of the groove for retention of the slide.

The body carries on its face a date scale 20 in alignment with the groove 12 and slide 15. This scale comprises twenty-eight equal divisions numbered to indicate the days of the month from 1 to 28, the first day division being at the end of the body remote from the groove 12 and the twenty-eighth day division being at the inner closed end of the groove 12. This scale is continued in the bottom of the groove, as at 21 in Fig. 3, with three divisions of the same length as those of the scale 20 and numbered to indicate the 29th, 30th, and 31st days of the month.

The slide 15 also carries a date scale 22 comprising thirty-one equal divisions of the same length as those of the scale 20, numbered to indicate the days of the month from 1 to 31, the first day division being at the inner end of the slide and the thirty-first at the other end.

The slides 16 and 17, which may be termed index slides and so marked for convenience of the user, carry period indicators 23 and 24, respectively, the length of each of which is equal to a predetermined number of day divisions on the date scale. As shown, these period indicators have lengths equal to eight day divisions on the date scale. The index slides also carry indices 25 and 26, respectively, located at a predetermined distance from the period indicators 23 and 24. As shown, the interval or space between the period indicators and the indices is equal to ten day divisions on the date scale. The indices may be marked in a distinctive colour and may, conveniently, each occupy a length of the slide equal to one day division on the date scale.

The slide 19 carries a setting mark 27 and a cycle scale 28. The setting mark may be distinctively coloured and preferably occupies a length of the slide equal to one day division of the date scale. The cycle scale comprises any suitable number of equal divisions of the same length as the day divisions of the date scale, and these divisions are consecutively numbered. The divisions of the cycle scale and the numbering thereof may commence with the set mark, which occupies the first division, and continue to 43, as shown, or the divisions and numbers up to, say, 14 or even up to 19, may be omitted. In such case, the remaining divisions and numbers will occupy the same space relation to the set mark as in the complete scale illustrated.

The portions 29 of the body between the slides may be and preferably are marked into divisions of length equal to and in register with the day divisions of the date scale. These divisions are for the purpose of facilitating the accurate setting of the slides by one another. For the same reason, the index slides 16 and 17 may be marked with divisions between the period indicators 23, 24, and the indices 25, 26, and below the indices, these divisions being of the same length as the divisions of the date scales. Twelve divisions below the indices will suffice but the entire lengths of the index slides may be divided as shown.

In the embodiment shown in Figure 4, the device comprises a body 11a carrying a circularly curved date scale 20a, 21a and the slides of the previously described embodiment are replaced by superposed circular discs 15a, 16a, 17a, and 19a of progressively less diameter, so that an annular peripheral portion of each lower disc is exposed beyond the periphery of the disc above. The peripheral portion of the lower disc 15a carries a date scale 22a; the peripheral portions of the discs 16a and 17a carry period indicators 23a and 24a and indices 25a and 26a; and the disc 19a carries a set mark 27a and cycle scale 28a, these elements corresponding to the similarly numbered elements of the form first described. The divisions of the circular scales, while not all of equal lineal measure from scale to scale, are all of equal angular measure. The several discs are secured to the body by any suitable means which will permit the discs to be rotated independently, such as a centrally disposed rivet 30.

The embodiment shown in Fig. 5 is, in effect, the bending of the embodiment of Fig. 1 to cylindrical form. The cylindrical type comprises a cylindrical body or core 11b upon which are rotatably mounted endless slides 15b, 16b, 17b, and 19b corresponding to the similarly numbered slides of the first described embodiment and provided with scales, period indicators, indices and set mark designated 22b, 23b, 24b, 25b, 26b, 27b, and 28b corresponding to the similarly numbered elements of the first described embodiment. In this form the body grooves and undercutting thereof may be omitted as the endless form of the slides will hold them to the core. The slides may be of any desired radial thickness, so that the form of the slides may range from thin bands rotatable on a spool-like core to discs independently rotatable on a mere connecting rivet. The body portions 29b intervening between the slides may be bands or discs irrevolubly mounted with respect to the core element 11b.

While two index slides or equivalent have been shown arranged between the date and cycle slides, the number of index slides may be more or less and the arrangement relative to the other slides may be otherwise than as shown. It will be understood that any arrangement of the date scales, other than that shown, which will enable the adjacent ends of the scales to be overlapped as required, will serve the purpose of establishing a calendar for any two consecutive months.

The period indicators 23, 24 and the cycle scale 28 (including the set mark 27) are so placed on their respective slides that, when the slides are in the closed positions shown in Figure 1, the upper ends of the indicators and of the set mark and cycle scale will be in register with the upper end of the date scale 20 on the body.

The length of the period indicators 23 and 24 and the location of the indices 25 and 26 relative to the period indicators are determined according to recent teachings of eminent authorities as to the relation of the period of fecundity to the date of commencement of menstruation.

The operation of the device is as follows:—

The date scale 20, 21 on the body is adjusted to the current month. If the month is a normal 28-day February the slide 15 remains pushed in so as to obscure the scale portion 21. If the current month is a leap year February of twenty-nine days, the slide 15 is pulled out far enough to expose only division 29 of the scale portion 21. For the 30-day and 31-day months, the slide 15 is pulled out accordingly. Upon proper adjustment of the slide 15, the scales 20, 21, and 22 provide a calendar for the current month and the next succeeding month. In the example shown in Fig. 3, the date scale 20, 21 is adjusted to a 31-day current month.

The operator next draws out the cycle slide 19 until the set mark 27 thereon registers exactly with day division of the scale 20, 21 upon which menstruation commenced in the current month. In the example, this is the seventh day.

Having determined, by observation over a period of months, the normal menstrual cycle or cycles, the slides 16 and 17 are pulled out until the indices 25 and 26 thereof register exactly with the division of the cycle scale numbered to correspond with the number of days in the menstrual cycle, or the number of days in the shorter of two cycles (if there are two). In the event of there being two cycles to consider, the slide 17 is now drawn out until the index 26 thereof registers exactly with the division of the cycle scale numbered to correspond with the number of days in the longer menstrual cycle. In the example, Fig. 3, the slide 16 is set to a cycle of 28 days and the slide 17 is set to a cycle of 32 days.

The period indicators 23 and 24 indicate on the date scale the period of fecundity, this period being read from the day division registering with the top of the upper indicator to the day division registering with the bottom of the lower indicator. In the example, the period of fecundity is shown to be from the 16th to the 27th, both days inclusive. It does not follow that conception could occur on every one of the days within the indicated period, as the device is calibrated to include the period of ovulation plus an allowance for the life of spermatoids, but conception can occur within and only within the period indicated.

The operation of the embodiments illustrated in Figures 4 and 5 is similar to that already described and will be understood therefrom.

In the following claims, the term "slide" is to be understood in a broad sense as including any member which is carried by and adjustable relatively to the body.

Having thus described our invention, what we claim is:—

1. A calculating device comprising a date scale including a pair of relatively movable parts adjustable to indicate the days of any two consecutive months, a menstrual cycle scale adjustable to the date scale and an indicator adjustable to the cycle scale to indicate on the date scale a period of fecundity.

2. A calculating device comprising a date scale including a pair of relatively movable parts adjustable to indicate the days of any two consecutive months, a menstrual cycle scale adjustable to the date scale and a plurality of indicators independently adjustable to the cycle scale to combinatively indicate on the date scale a period of fecundity.

3. A calculating device comprising a date scale including a pair of portions each divided into thirty-one divisions numbered from 1 to 31, said portions being relatively movable whereby an end of one portion may be moved past a plurality of divisions of the adjacent end of the other portion, whereby the combined scale portions may indicate the days of any two consecutive months, a menstrual cycle scale adjustable to the date scale and an indicator adjustable to the cycle scale to indicate on the date scale a period of fecundity.

4. A calculating device comprising a date scale including a pair of relatively movable parts adjustable to indicate the days of any two consecutive months, a menstrual cycle scale divided into a plurality of consecutively numbered divisions, a set mark on said cycle scale adjustable to the date scale and an indicator adjustable to the cycle scale to indicate on the date scale a period of fecundity.

5. A calculating device comprising a date scale including a pair of relatively movable parts adjustable to indicate the days of any two consecutive months, a menstrual cycle scale adjustable to the date scale, an indicator to indicate on the date scale periods of fecundity and an index in fixed relation to said indicator and adjustable to the cycle scale, thereby to position the indicator with reference to the date scale.

6. A calculating device comprising a date scale adjustable to indicate the days of any two consecutive months, a menstrual cycle scale adjustable to the date scale, a plurality of independently movable indicators, an index in fixed relation to each said indicator and independently adjustable to the cycle scale, thereby to position the indicators with reference to the date scale to combinatively indicate periods of fecundity.

7. A calculating device comprising a date scale including a pair of relatively movable portions divided into day divisions of equal magnitude, said portions being adjustable to provide a calendar for any two consecutive months, a movable menstrual cycle scale having a plurality of consecutively numbered divisions of the same magnitude as the divisions of the date scale, a set mark in fixed relation to said cycle scale and adjustable to the date scale, and a movable indicator, the magnitude of which is equal to the combined magnitudes of eight day divisions of the date scale and an index in fixed relation to said indicator and spaced therefrom a distance corresponding to the combined magnitudes of ten day divisions of the date scale, said index being adjustable to the cycle scale to position the indicator with reference to the date scale to indicate thereon periods of fecundity.

8. A calculating device comprising a date scale including a pair of relatively movable portions divided into day divisions of equal magnitude, said portions being adjustable to provide a calendar for any two consecutive months, a movable menstrual cycle scale having a plurality of consecutively numbered divisions of the same magnitude as the divisions of the date scale, a set mark in fixed relation to said cycle scale and adjustable to the date scale, and a plurality of independently movable indicators, the magnitude of each of which is equal to the combined magnitudes of eight day divisions of the date scale and an index in fixed relation to each of said indicators and spaced therefrom distances corresponding to the combined magnitudes of ten day divisions of the date scale, said indices being independently adjustable to the cycle scale to position the indicators with reference to the date scale to combinatively indicate thereon periods of fecundity.

9. A calculating device comprising a body, a date scale carried by the body in fixed relation thereto, a slide carried by the body in alignment with said date scale, a second date scale on said slide, a second slide carried by said body, a menstrual cycle scale carried by said second slide and a set mark on said second slide adjustable to the date scale, a third slide carried by the body, an index on said third slide adjustable to the cycle scale and a period indicator on said third slide to indicate on the date scale a period of fecundity.

10. A calculating device comprising a body, a date scale carried by the body in fixed relation thereto, a slide carried by the body in alignment with said date scale, a second date scale on said slide, a second slide carried by said body, a menstrual cycle scale carried by said second slide and a set mark on said second slide adjustable to the date scale, a plurality of further slides carried by the body, an index on each of said further slides adjustable to the cycle scale, and a period indicator on each of said further slides to combinatively indicate on the date scale a period of fecundity.

11. A calculating device comprising a body, a graduated scale on said body in fixed relation thereto, a slide carried by the body, a graduated scale on said slide adapted to co-operate with said first scale, a second slide, a graduated scale thereon, a set mark on said second slide to co-operate with one of said two first mentioned scales, a third slide, an indicator on said third slide to co-operate with said two first mentioned scales and an index on said third slide to co-operate with the scale of said second slide.

12. A calculating device comprising a body, a graduated scale ond said body in fixed relation thereto, a slide carried by the body, a graduated scale on said slide adapted to co-operate with said first scale, a second slide, a graduated scale thereon, a set mark on said second slide to co-operate with one of said two first mentioned scales, a plurality of further slides carried by the body, an indicator on each of said further slides to co-operate with said two first mentioned scales, and an index on each of said further slides to co-operate with the scale of said second slide.

13. In a time or date calculating device, a plurality of scales in alignment, each carrying consecutive numbers from 1 to 31 inclusive, said scales being relatively movable in the direction of their alignment whereby the numbers 29, 30 and 31 of each scale excepting the last of the series may be obscured by the numbers 1, 2, and 3 of the next succeeding scale of the series, whereby the scales may be adjusted to constitute a calendar for any group of consecutive months equal in number to the number of scales in the series.

14. In a calculating device, a body, a scale in fixed relation thereto comprising consecutive numbers from 1 to 28 inclusive, a groove in said body in alignment with said scale, a continuation of said scale in the bottom of said groove comprising the numbers 29, 30, and 31, a slide in said groove adapted to pass over said scale continuation, and a scale on said slide comprising consecutive numbers from 1 to 31 inclusive.

15. In a time or date calculating device, a plurality of scales each comprising consecutive numbers from 1 to 31 inclusive, the major portions of said scales being in alignment and said scales being relatively movable in the direction of their alignment, whereby their adjacent end portions may be caused to overlap to predetermined extent to exclude superfluous day indications when an overlapped scale represents a month having less than thirty-one days, thereby to constitute a calendar for any group of consecutive months equal in number to the number of scales in the series.

CHARLES A. DECARY.
ANATOLE BOHÉMIER.